US005428546A

United States Patent [19]

Shah et al.

[11] Patent Number: 5,428,546

[45] Date of Patent: Jun. 27, 1995

[54] METHOD AND APPARATUS FOR TRACKING VEHICLE LOCATION

[75] Inventors: Mukesh C. Shah; Sanjiv Prabhakaran, both of San Jose, Calif.

[73] Assignee: Mobile Information Systems, Sunnyvale, Calif.

[21] Appl. No.: 961,736

[22] Filed: Oct. 16, 1992

[51] Int. Cl.$^{6}$ .......... G06F 165/00

[52] U.S. Cl. .......... 364/449; 340/990; 342/457

[58] Field of Search .......... 364/449, 460, 452; 342/457, 357; 340/990, 995, 989, 992; 395/600, 153

[56] References Cited

U.S. PATENT DOCUMENTS

| | | | |
|---|---|---|---|
| 4,660,037 | 4/1987 | Nakamura | 340/990 |
| 4,924,402 | 5/1990 | Ando et al. | 364/449 |
| 4,954,959 | 9/1990 | Moroto et al. | 364/449 |
| 5,003,317 | 3/1991 | Gray et al. | 342/457 |
| 5,067,081 | 11/1991 | Person | 364/444 |
| 5,140,532 | 8/1992 | Beckwith, Jr. et al. | 395/101 |
| 5,155,689 | 10/1992 | Wortham | 364/460 |
| 5,243,530 | 9/1993 | Stanifer et al. | 364/452 |
| 5,272,638 | 12/1993 | Martin et al. | 364/444 |
| 5,334,974 | 8/1994 | Simms et al. | 340/990 |

*Primary Examiner*—Michael Zanelli
*Attorney, Agent, or Firm*—Townsend and Townsend Khourie and Crew

[57] ABSTRACT

An method and apparatus for simultaneously displaying a raster map and vectorized street information corresponding to a vehicle position is provided. The system extracts information from a plurality of databases, including a mobile position database, a raster database and a vector database. The database information is interrelated by common latitude and longitude information. A graphical user interface displays the information in a format easily understood a dispatcher.

40 Claims, 5 Drawing Sheets

METHOD AND APPARATUS FOR TRACKING VEHICLE LOCATION

BACKGROUND OF THE INVENTION

This invention relates to a system for presenting the location of a fleet of vehicles to a fleet manager or fleet dispatcher. Specifically, the invention is related to an integrated system which displays a raster map and vectorized display information corresponding to vehicle position.

In the fleet management business, knowledge of vehicle location is a powerful tool for the manager or dispatcher to efficiently operate their fleet. Assimilating the location of the fleet as quickly as possible is critical for efficient decision making. Various navigational systems, including the LORAN system and the Global Positioning System (GPS), are used to reliably determine vehicle location. Both the LORAN and GPS navigation systems rely on externally transmitted radio frequency signals to calculate the location of a receiving antenna mounted on the vehicle. The vehicle position is defined in terms of a latitude and longitude value.

In order for the latitude and longitude values to be easily utilized by the dispatcher, latitude and longitude information is typically displayed in a map format. The two most common map formats for displaying vehicle position are 1) a raster map and 2) a vector map display. FIG. 1 illustrates a raster map display. A raster map is a digitized version of the type of road maps or paper maps most dispatchers are familiar with. A raster map is formed by digitally scanning a standard road map or paper map. Like the standard road map, raster maps typically contain visual features, such as natural and manmade features of the land, contour lines featuring shape and elevation and specific features such as roads, towns, water areas and vegetation.

One prior art raster display system is the MapStation developed by Spatial Data Sciences. MapStation is capable of displaying an icon representative of vehicle position moving along a raster map as the vehicle changes its latitude and longitude position. Since the latitude and longitudinal position of the icon corresponds to a street location, the icon moves along a particular street on the raster map display. However, because the raster map is merely a digitized representation of the street, no interrelationship between different street locations or landmarks exists. Thus although the MapStation can display latitude and longitude information, it cannot display intelligent street information such as the particular street the vehicle is traveling on or the proximity of the vehicle to a particular street or landmark.

FIG. 2 shows a block diagram of a prior art raster map display system 200 comprised of: a Mobile Position Database 210, a Mobile Position Utility Library 212, a Raster Database 214, a Raster Map Utility Library 216, an Interface Utility Library 218, and a Raster Display 220. The Mobile Position Library 212 contains routines which access the Mobile Database 210 retrieving vehicle identification, latitude and longitude information. The latitude and longitude values of the vehicle are transmitted to the Raster Utility 216 via bus 222. In response, the Raster Utility 216 accesses the Raster Database 214 and extracts a latitude and longitude value for the particular vehicle. The latitude, longitude and vehicle identification values are passed to the Interface Utility 218 where they are used for display of an icon on the Raster Display 220. In addition, the Raster Utility 216 extracts digitized information for a defined area based on the fleet location and zoom level for display as a raster map on the Raster Display 220.

FIG. 3 illustrates a vector map display. FIG. 4 illustrates a block diagram of the display system for implementing the vector map display shown in FIG. 3. Unlike the Raster Map Database shown in FIG. 2, the Vector Map Database 414 contains street and address information that provides the computer with the capability to identify the address of a vehicle location. The address information could consist of the block number, street name, county information. The vector display is generated in a similar manner to the raster display previously discussed. Streets in the Vector Map Database 414 are defined in terms of segments. Segments are interconnected so that streets are interrelated to each other.

However, although the vector map contains street information, it does not contain visual features. Thus such as natural features of the land, contour lines featuring shape and elevation and specific features such as towns, water areas and vegetation which are typically displayed on a raster map are not shown on a vector display map.

Because visual features are so important to the dispatcher, one vector map display system created by Etak Corporation has tried to simulate the visual features such as landmarks commonly found in raster type display systems. The Etak system creates a stick-like outline of the landmark. Although the landmark is represented, the quality of the representation is inferior to the representation of the raster display.

Assimilating vehicle location as quickly as possible for efficient decision making is of prime importance. The majority of users are familiar with the road-map type display of raster displays and prefer digitized raster maps for being able to quickly recognize vehicle position. Because raster maps include geographic landmarks and visual features not found in the stick-like interconnection presented by vector maps, it is often easier to find or to designate a vehicle position. Additionally, users are accustomed to describing vehicle location as being a certain distance from a school, building or other landmark. However, although users are often more comfortable determining vehicle position using a raster map, raster maps are incapable of providing intelligent street information valuable in decision making. For example, a dispatcher would not be provided with information related to the distance between the current vehicle position and the vehicle destination using information provided by a raster data display system.

An integrated system for providing a raster map display which also provides intelligent address information is needed.

SUMMARY OF THE INVENTION

An integrated system which simultaneously displays a raster map and vectorized street information corresponding to a vehicle position is provided. The system extracts information from a plurality of databases, interrelates the database information by common latitude and longitude information and displays the information in a format easily used by a dispatcher. The vehicle position information is presented on a graphical workstation system displaying a digitized raster map and intelligent street location information. A first database is a geo-referenced digitized raster map database that contains visual features, such as natural and manmade features of the land, contour lines featuring shape and elevation, and specific features such as roads, towns, water areas and vegetation. A second database contains information transmitted from the navigational system defining vehicle position for a predetermined period. A third database is a vectorized database of selected geographic and cartographic information that the computer can access. The vector database provides intelligent street, block number, address information, and nearest cross-section of major streets with reference to the vehicle position. By interrelating the three databases by a common vehicle identification and a latitude and longitude value, vehicle position within a raster map and its corresponding vector information can be simultaneously displayed.

Just having a digitized raster display map lacks the intelligent address information obtained from vector data systems. Just having a vector display map lacks the visual features the raster maps contain. Having both raster and vector information integrated and presented simultaneously to the fleet manager or dispatcher increases efficiency, productivity and improves decision making capability.

In accordance with the present invention an integrated system for simultaneously displaying a user locatable mark representative of a vehicle position on a raster map on a first display segment and intelligent street information on a second display segment is provided. The integrated system is comprised of: a first raster display segment having a first and second axis representing the latitudinal and longitudinal position of the vehicle position respectively, where the first raster display segment for displaying a user locatable mark corresponding to the latitude and longitude of the vehicle position, a first database containing digitized information representative of a first region, a second database for storing vehicle data indicative of the latitude and longitude of the vehicle during a predetermined time interval, a third database containing vector information representative of the first region, and a second display segment for displaying vector text information corresponding to the latitude and longitude of the vehicle position.

Also in accordance with the present invention, a method for creating an integrated system which displays a raster map and vectorized display information corresponding to vehicle position is provided. The method includes the steps of: defining a coordinate system having a first axis representing the latitude of the vehicle position and a second axis representing the longitude of the vehicle position, extracting digitized information representative of a raster map from a first database, displaying a graphical representation of the digitized information adjacent to said first axis and said second axis to form a raster map of a first predefined area, storing mobile position data information into data blocks where each data block is stored in a second database and is indicative of the latitude and longitude of the vehicle during a predetermined time interval, defining a third database which contains vector information, displaying a user locatable mark in the first display segment where the user locatable mark corresponds to the latitude and longitude of the vehicle position, and displaying vector text information in a second segment of the display where the vector text information corresponds to the latitude and longitude of said user locatable mark.

BRIEF DESCRIPTION OF THE DRAWINGS

The novel features believed characteristic of the invention are set forth in the appended claims. The invention, however, as well as other features and advantages thereof, will be best understood by reference to the detailed description which follows, when read in conjunction with the accompanying drawings, wherein:

DESCRIPTION OF THE PREFERRED EMBODIMENT

In accordance with the present invention, an integrated system for simultaneously displaying a user locatable mark representative of a vehicle position on a raster map on a first display segment and intelligent street information on a second display segment is provided. The integrated system extracts information from the mobile position, vector and raster databases, interrelates the database information by a common vehicle position information, and displays the information in a format which can be easily utilized by the dispatcher.

Figure 1:
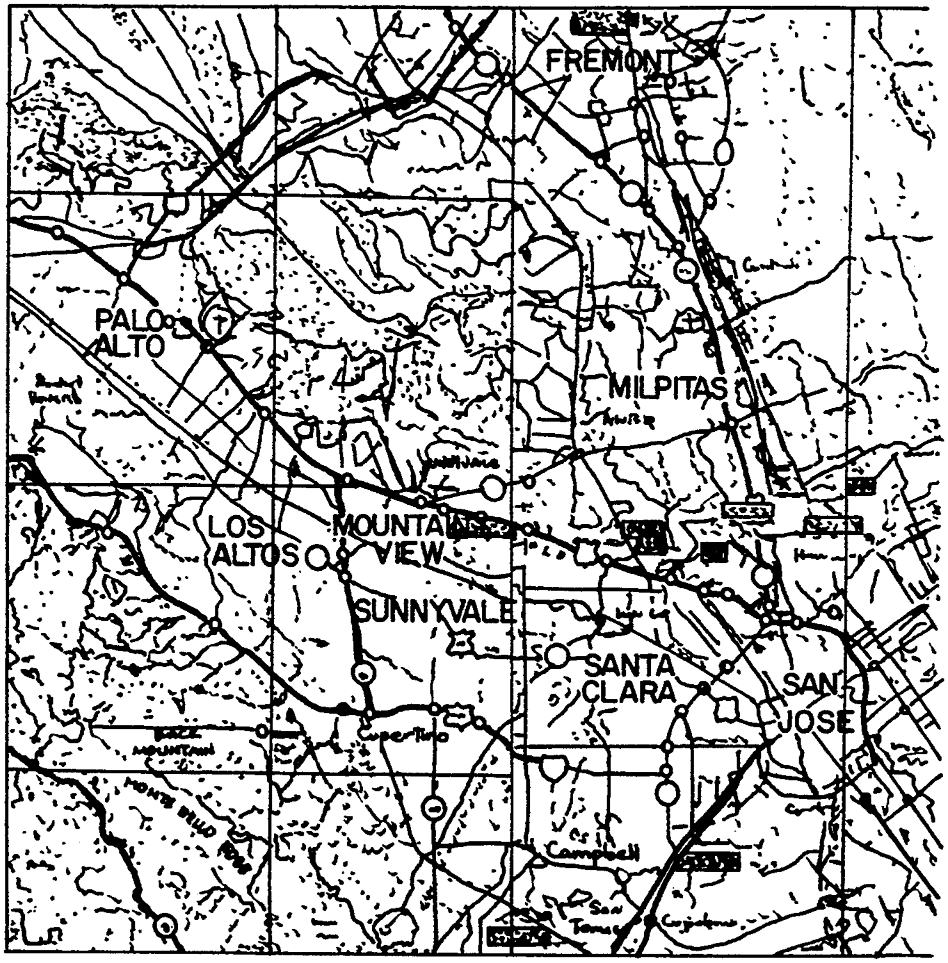
FIG. 1. PRIOR ART
FIG. 1 illustrates a raster map display.
Figure 2:
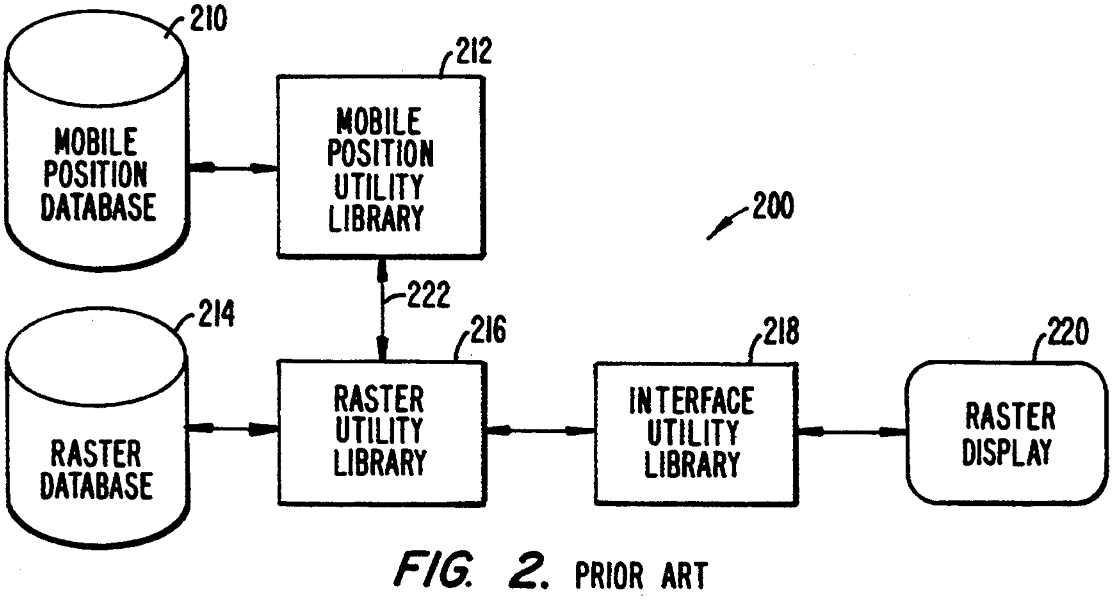
FIG. 2. PRIOR ART
FIG. 2 illustrates a block diagram of the raster map display system for implementing the raster display shown in FIG. 1.
Figure 3:
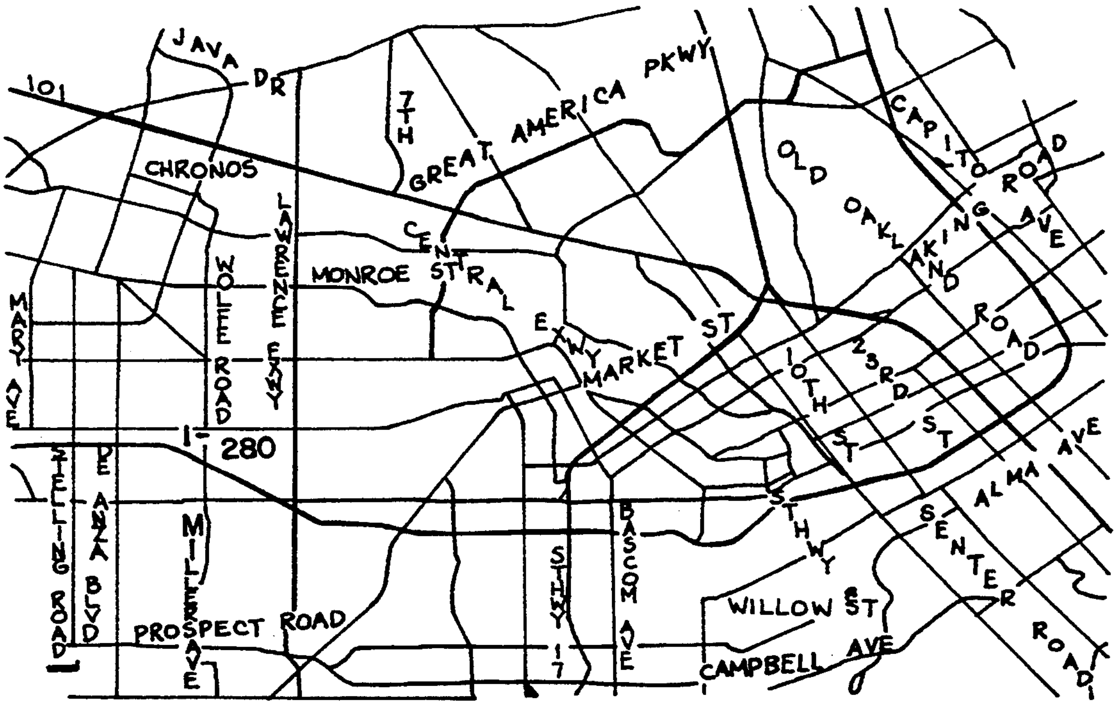
FIG. 3. PRIOR ART
FIG. 3 illustrates a vector map display.
Figure 4:
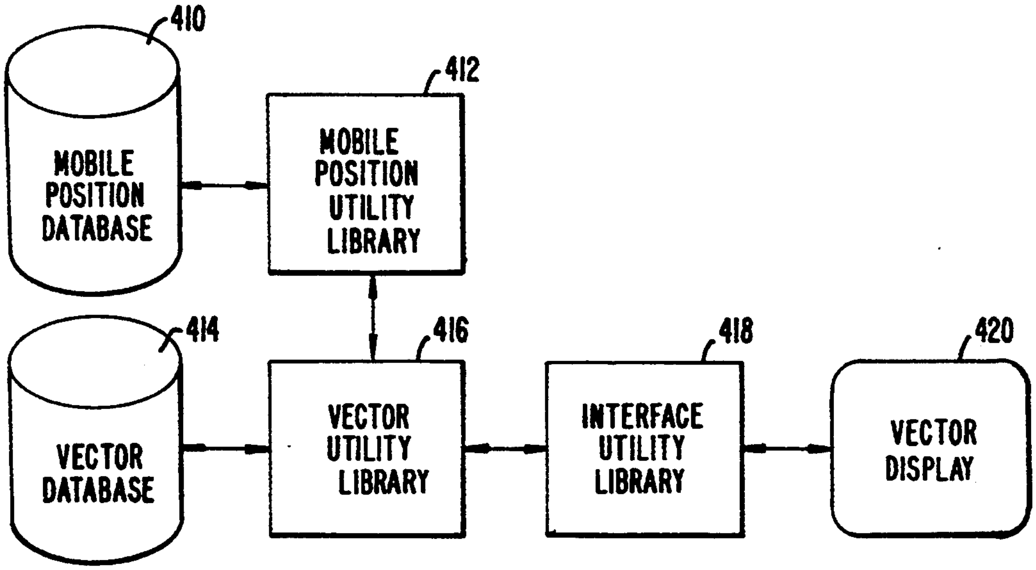
FIG. 4. PRIOR ART
FIG. 4 illustrates a block diagram of the vector map display system for implementing the vector display shown in FIG. 3.
Figure 5:
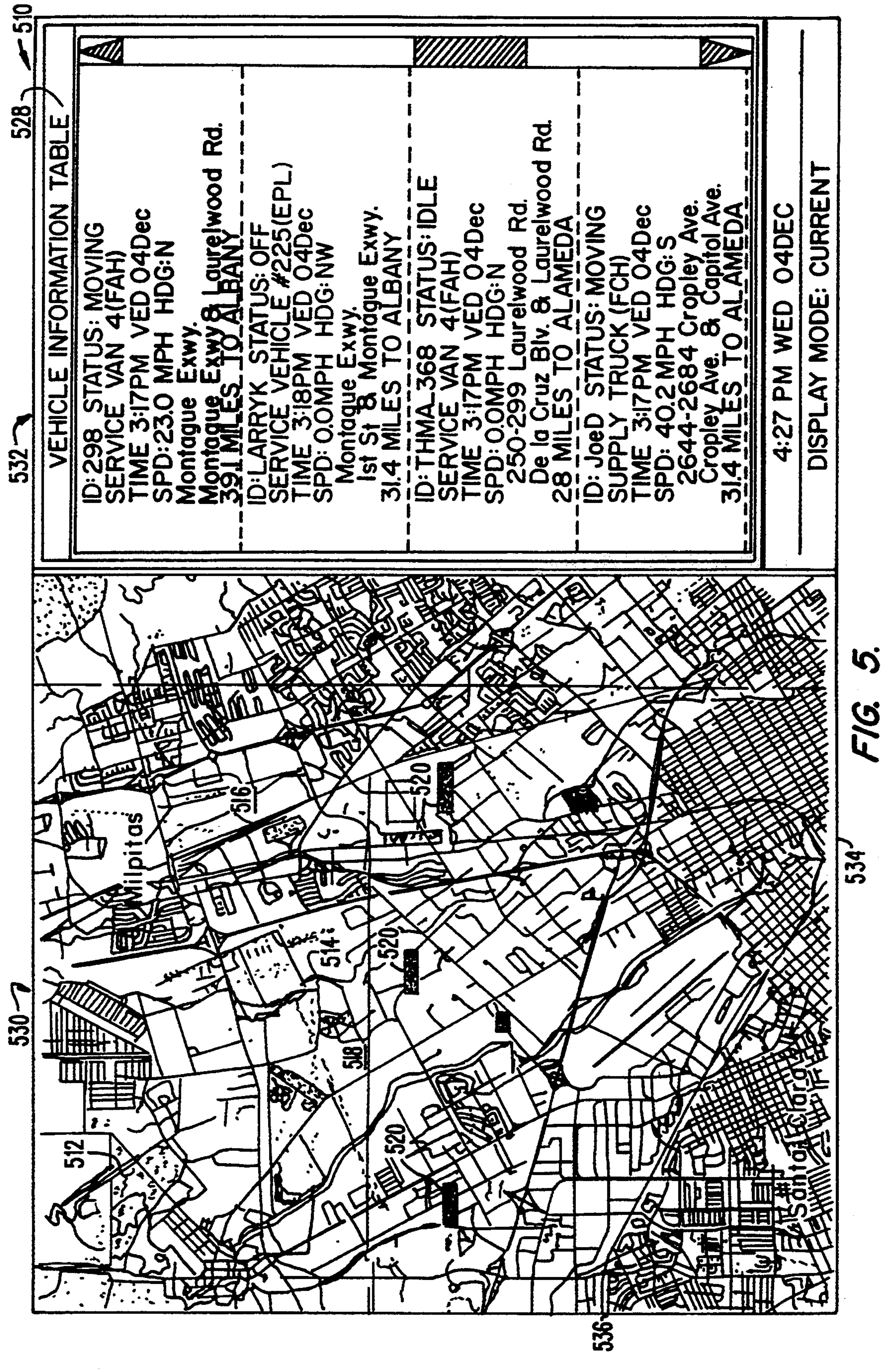
FIG. 5 illustrates an integrated raster map display and vector information display according to the preferred embodiment of the present invention.

FIG. 5 illustrates an integrated raster map display and vector information display according to the preferred embodiment of the present invention. The raster map 510 includes natural features such as marshlands 512 and creeks 514. The raster map 510 also includes manmade features such as the Auto Assembly Plant 516 and Agnews Hospital 518. Icons 520 show the position of the vehicles identified in the vector information table 528. The vector information table 528 indicates selected geographic and cartographic information retrieved from the vector database. The vector information table 528 provides intelligent street information such as block number, address information, and nearest cross-section of major streets with reference to the vehicle position.

The display shown in FIG. 5 is typically divided into two regions or segments: a raster display segment 530 and a vector information display segment 532. The raster display segment 530 includes a first and second axis 534, 536 representing the latitudinal and longitudinal position of the vehicle position respectively. A digitized map of the region through which the vehicle travels is displayed in the first segment of the display 530, adjacent to the first and second axis 534, 536.

Figure 6:
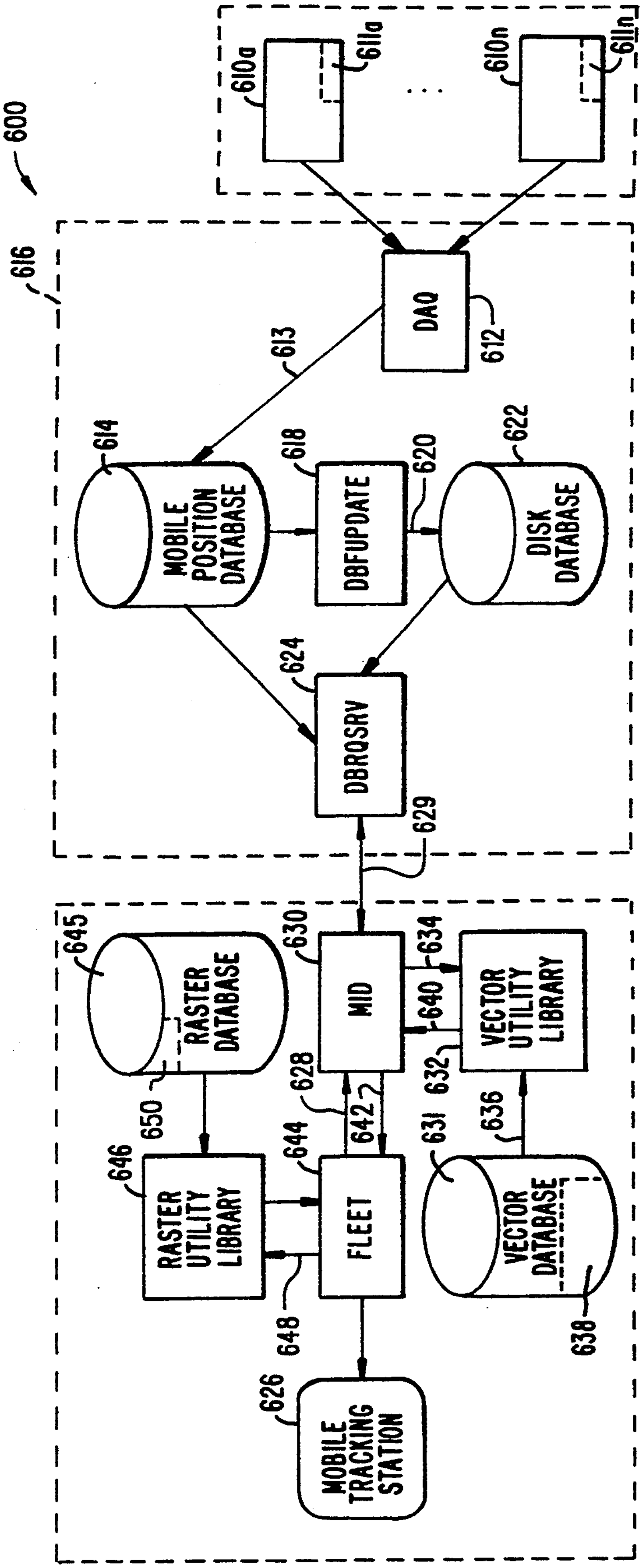
FIG. 6 illustrates a block diagram for implementation of the integrated raster map display and information display shown in FIG. 5.
Figure 7:
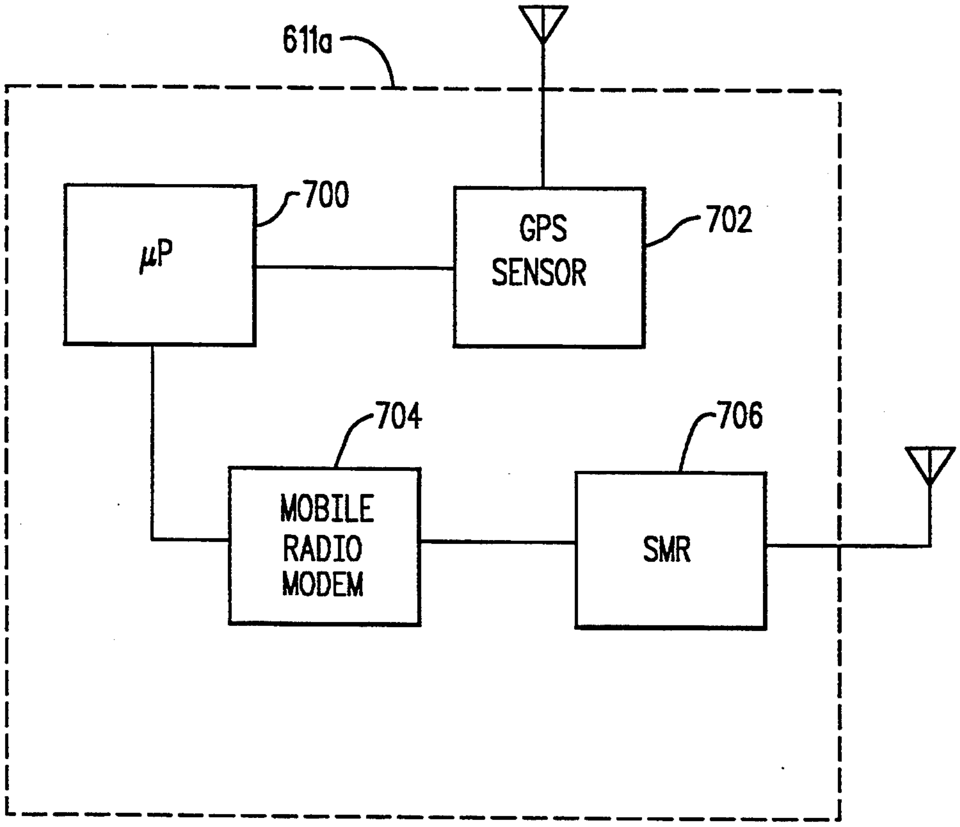
FIG. 7 illustrates a block diagram of a fleet mobile data suite (MDS).

FIG. 6 illustrates a block diagram of the fleet tracking system 600 for automatic vehicle location utilizing the present invention. Each vehicle 610*a*–610*n* includes a navigational tracking device hereafter called a fleet mobile data suite (MDS) 611*a*–611*n*. As shown in FIG. 7, the fleet MDS 611 is comprised of a microprocessorcontrolled circuit (700) coupled to a GPS navigational sensor (702), a Mobile Radio Modem (704), and a Specialized Mobile Radio (SMR) (706) operational in the 800–900 MHz frequency range. The fleet MDS 611 continuously compiles latitude and longitude position data from the GPS sensor (702). Latitude and longitude position data is periodically transmitted to the Data Acquisition system 612.

The Mobile Position Block 616 processes vehicle location information typically on a UNIX based computer. The Mobile Position Block 616 is preferably comprised of: a Data Acquisition System 612, a Mobile Position Database 614, a UNIX process DBFUPDATE 618, a Disk Database 622, and a UNIX process DBREQSRV 624. The Data Acquisition system 612 includes a personal computer coupled to both a Base Data Link Controller, and a Specialized Mobile Radio (SMR) operational in the 800–900 MHz frequency range. The Data Acquisition system 612 receives latitude and longitude position data from the fleet MDS 611, attaches a vehicle identifier to the navigational position data, and transmits the data block 613 (vehicle identification, latitude, longitude) to the Mobile Position Database 614. Vehicle position is defined in terms of a latitude and longitude value during a predetermined time period.

The UNIX process DBFUPDATE 618 scans the Mobile Position Database 614, preferably every 5 seconds, for any new information from the fleet MDS. The new data 620 is permanently stored in the Disk Database 622 for subsequent retrieval of historical information. Another UNIX process DBREQSRV 624 processes requests by the user from the Mobile Tracking Station 626 for navigational position information. The Mobile Tracking Station 626 is preferably a high resolution color UNIX workstation. User requests 628 are originated by Mobile Information Data Process 630 (MID), a UNIX process running on the Mobile Tracking Station 626.

The Mobile Information Data Process 630 receives latitude and longitude position data for a particular vehicle. The Mobile Information Data Process 630 accesses the Vector Database 631 using the Vector Utilities 632. The Vector Utilities 632 match the latitude and longitude position information 634 to the latitude and longitude of street segment information 636 from the Vector Database 631. In addition, the Vector Utilities 632 match the latitude and longitude position information 634 to the latitude and longitude information of the cross-section of major streets 636 in the Cross-section Vector Database 638. The Cross-section Vector Database 638 is a subsection of the Vector Database 631.

The nearest matching street segment, its street name and block number range, and the nearest cross-section of major streets, and its street name 640 are transmitted to the Mobile Information Data Process 630. The Mobile Information Data Process 630 attaches the street text information to the mobile position information and sends this data packet 642 to the Fleet Process 644.

The Fleet Process 644, preferably a UNIX based process, is the user interface display process. The Fleet Process 644 receives mobile position information and street text information from the Mobile Information Data Process 630. In addition, the Fleet Process 644 accesses the Raster Database 645 through the Raster Map Utilities 646.

The Raster Map Utilities 646 match the latitude and longitude mobile position 648 from the fleet MDS 611 to the various digitized raster maps data 650 in the Raster Map Database 645. By specifying the zoom level option, preferably using the Xll/Motif graphical user interface on the Mobile Tracking Station 626, the digitized raster map is displayed in one display window segment 530 and the corresponding street text information on another display window segment 532. A user locatable mark 520 represents the fleet MDS position for a particular vehicle. The icon 520 is positioned at the corresponding latitude and longitude location on the raster map display 530.

Historical data requests may be made by specifying a particular time period and a particular fleet MDS 611. The data request is sent by the Fleet Process 644 to the Mobile Information Data Process 630. The Mobile Information Data (MID) Process 630 in turn sends a request 629 to the DBRQSRV Process 624. The DBRQSRV Process 624 accesses the Disk Database 622 and retrieves all reports for the specified time period and fleet MDS 611. For every historical report sent back to the MID process 630, the above described process flow for accessing and displaying the raster map, vector street information, and displaying the user locatable mark representing the position of the navigational system is followed.

The vehicle display system includes at least three databases (a Mobile Position Database 614, a Raster Database 645 and a Vector Database 631). The database information is interrelated by common latitude and longitude position data. A Mobile Tracking Station 626 displays the position, raster and vector information in a format easily understood by the dispatcher or fleet manager.

The first database, the Mobile Position Database 614, is a positional information database for storing vehicle position information received from the navigation systems. Navigational data transmitted from systems such as LORAN and GPS (Global Positioning System) is stored into data records indicating the latitude and longitude of a particular vehicle during a predetermined time interval. The DAQ Process 612 is used to format position data received from the navigational system into the Mobile Position Database 614. The vehicle identification is used as locator field to access the database for a particular vehicle. Vehicle position data is stored related to the vehicle identifier.

The second database, the Raster Database 645, is generated by digitally scanning a standard road map or paper map. The Raster Database 645 contains a digitized version of the visual features of the land for a specified region. Digitized raster information is stored in the Raster Database 645 in data records. Each data record corresponds to a digitized region having a particular latitude and longitude value. The latitude and longitude values are used as a locator field for accessing the Raster Database 645.

Data from both the Raster Database 645 and the Mobile Position Database 614 are used in displaying the raster map and icon 520 in the first segment 530 of the display shown in FIG. 5. The FLEET Process 644 in combination with the Raster Map Utilities 646, MID Process 630, and Vector Map Utilities 632 contains routines to access the Mobile Position Database 614 and the Raster Map database 645. Both the Mobile Position Database 614 and the Raster Map Database 645 include a latitude and longitude field identifier. The Raster Map Utility 646 in combination with the FLEET process 644 and MID 630 matches the longitude and latitude values from the Mobile Position Database 614 and the Raster Map Database 645 and displays an icon 520 (representative of a particular vehicle) moving along the raster map as it changes its latitude and longitude position. The icon 520 moves according to the navigational data extracted from the Mobile Position Database 614 for a particular vehicle. The icon 520 is also displayed in the first display segment 530. Since the latitude and longitudinal position of the icon 520 corresponds to a street location, the icon 520 moves along a particular street on the raster map display 530.

However, because the raster map is merely a digitized representation of the street, no interrelationship between different street locations or landmarks exists and intelligent street information is not displayed. A third database, the Vector Database 631, is needed to provide intelligent street information.

Vector address data and street information is publicly available from the US Census Bureau. The US Census provides GBF/DIME (Geographic Base Files/Dual Independent Map Encoding) files which are a common source of address data for dispatching applications. These files contain information describing the street network and other features. Each field record contains the segment name, address range and ZIP code. Node numbers for intersections are referenced to the vehicle latitude and longitude coordinate position.

A third database the Vector Database 631, contains vector information provided from GBF/DIME files. Vector information is displayed in the second display segment 532. The vector information displayed in segment 532 is typically displayed as text and relates intelligent street information corresponding to the latitude and longitude of a particular vehicle. Display segment 532 of FIG. 5 most clearly represents the vector text information.

The MID process 630 contains routines to access the Mobile Position Database 614. Both the Mobile Position Database 614 and the Vector Map Database include a latitude and longitude field identifier. The Vector Utility 632 in combination with the MID process 630 contains routines to extract block number, street name, cross-section of major streets and other address related information and to match the longitude and latitude values from the Mobile Position Database 614 to the Vector Map Database 632. The Mobile Tracking Station 626 displays the vehicle position on a raster map and corresponding address information simultaneously.

The steps for display of the integrated system include defining a coordinate system having a first axis representing the latitude of the vehicle position and a second axis representing the longitude of the vehicle position. Digitized information representative of a raster map is extracted from the Raster Database 645 and displayed adjacent to the first and second axes to form a raster map of a first predefined area.

Mobile position data from the GPS navigation system corresponding to vehicle latitude and longitude position during a predetermined time interval is extracted from the Mobile Position Database 614. A user locatable mark 520 in the first display segment 530 corresponding to the latitude and longitude of the vehicle position is displayed. Intelligent street information is extracted from a third database, the Vector Database 631. Vector text information is displayed in a second segment 532 of the display. The vector text information corresponds to the latitude and longitude of the user locatable mark 520.

In summary, a novel technique has been described for combining raster and vector information. While the invention has been described with reference to the illustrated embodiment, this description is not intended to be construed in a limiting sense. Various modifications of the illustrated embodiment as well as other embodiments of the invention will become apparent to those persons skilled in the art upon reference to this description. For example, instead of specifying vehicle position as related to a coordinate system dependent on latitude and longitude, vehicle position can be specified as a function of an x, y, z coordinate system. It will be understood, therefore that the invention is defined not by the above description, but by the appended claims.

What is claimed is:

1. A method of displaying a user locatable mark representative of a vehicle position, wherein the magnitude of at least a first Value and a second value define said vehicle position, comprising the steps of:

defining a first axis for said first value in a first segment of a display;

defining a second axis for said second value in said first segment of said display;

extracting data from a first database, said first database containing digitized information representative of a first predetermined area;

displaying a graphical representation of said digitized information adjacent to said first axis and said second axis to form a raster map of said first predetermined area;

extracting data from a second database, said second database containing mobile position data corresponding to said first value and said second value;

displaying said user locatable mark in said first display segment, said user locatable mark representative of said vehicle position during a predetermined time period;

extracting information from a third database, said third database containing vector information representative of said vehicle position in said first predetermined area; and displaying vector text information corresponding to said first value and said second value of said user locatable mark, said vector text information being displayed on said second segment of said display.

2. The method recited in claim 1, wherein said first value is the latitude of the vehicle position and said second value is the longitude of the vehicle position.

3. The method recited in claim 1, wherein said first value is the position of the vehicle in the x direction and the second value is the position of the vehicle in the y direction.

4. The method recited in claim 3, wherein said vehicle position is additionally defined in terms of a third value, wherein said third value is the position of the vehicle in the z direction.

5. The method as recited in claim 1, wherein said vehicle position is defined in relation to a nearest cross-street.

6. An integrated system for displaying a user locatable mark representative of a vehicle position on a raster map on a first display segment and vehicle position information on a second display segment, wherein the magnitude of at least a first value and a second value define said vehicle position, comprising:

means for simultaneously displaying a first display segment and a second display segment, the first display segment having a first and second axis, the first axis for said first value, the second axis for said second value, wherein a user locatable mark corresponding to the magnitude of said first value and said second value at a predetermined time period is displayed on the first display segment;

a first database for storing digitized information representative of a first predetermined area;

a second database for storing mobile data information indicative of said first value and said second value during a predetermined time interval;

a third database containing vector information representative of said first display segment, a second display segment for displaying vector text information corresponding to said first value and said second value of the user locatable mark; and means for interrelating information from the first, second, and third database so that vehicle position information is displayed on a first raster display segment simultaneously with the corresponding vector text information.

7. The method recited in claim 6, wherein said first value is related to the latitude of the vehicle position and said second value is related to the longitude of the vehicle position.

8. The method recited in claim 6, wherein said first value is the position of the vehicle in the x direction and the second value is related to the position of the vehicle in the y direction.

9. The method recited in claim 8, wherein said vehicle position is additionally defined in terms of a third value, wherein said third value is related to the position of the vehicle in the z direction.

10. The method as recited in claim 6, wherein said vehicle position is defined in relation to a nearest cross-street.

11. A method of tracking a fleet of vehicles comprising:

providing a digitized representation of a predetermined area to form a raster map from a first database and displaying said digitized representation of said predetermined area onto a first display segment;

providing a plurality of vehicle positions to a second database, each of said plurality of vehicle positions corresponding to a user locatable mark;

retrieving said plurality of vehicle positions from said second database and displaying said user locatable mark for each of said plurality of vehicle positions onto said digitized representation of said predetermined area, providing vector text information comprising intelligent street information from a third database, said vector text information further comprising data corresponding to said plurality of vehicle positions;

retrieving said vector text information and displaying said vector text information onto a second display segment.

12. The method of claim 11 wherein each of said vehicle positions comprises a first value and a second value.

13. The method of claim 12 wherein said first value is a latitude and said second value is a longitude.

14. The method of claim 11 wherein said raster map is digitally scanned from a road map.

15. The method of claim 11 wherein said vector text information comprises a street name.

16. The method of claim 11 wherein said vector text information comprises a block number.

17. The method of claim 11 wherein said vector text information comprises a major street cross-section.

18. The method of claim 11 wherein said first display segment and said second display segment are simultaneously displayed.

19. The method of claim 11 further comprising:

specifying a predetermined post time, said post time comprising a time prior to a present time;

retrieving said vehicle positions for a vehicle for said predetermined post time; and displaying said user locatable mark for said vehicle positions for said predetermined post time.

20. A system for fleet management comprising:

a plurality of vehicles, each of said plurality of vehicles comprising a navigation tracking device;

a data acquisition means operably coupled to said navigation tracking device, said data acquisition means receiving a first value and a second value for each of said plurality of vehicles, said first value and said second value defining a vehicle position;

a mobile position database operably coupled to said data acquisition means, said mobile position database comprising said first value and said second value;

a raster database, said raster database comprising a digitized representation of a raster map.

a vector database comprising intelligent street information and vector text information to define said vehicle position for each of said plurality of vehicles, a first display segment comprising said digitized representation of said raster map and a plurality of user locatable marks, each of said plurality of user locatable marks representative of one of said plurality of vehicles at said vehicle position; and a second display segment comprising said vector text information for each of said plurality of vehicles.

21. The system of claim 20 wherein said vehicle position is for a predetermined time period.

22. The system of claim 20 further comprising a vector utility, said vector utility matching said first value and said second value to a major street cross-section.

23. The system of claim 20 further comprising a raster map utility, said raster map utility matching said first value and said second value to a location on said raster map.

24. The system of claim 20 wherein said user locatable mark is an icon.

25. The system of claim 20 wherein said navigation tracking device comprises a microprocessor means operably coupled to a global positioning system (GPS) navigational sensor and a mobile radio modem operably coupled to said microprocessor means.

26. The system of claim 20 wherein said raster map is digitally scanned from a road map.

27. The system of claim 20 wherein said first value is a latitude and said second value is a longitude.

28. The system of claim 20 wherein said vector text information comprises a street name.

29. The system of claim 20 wherein said vector text information comprises a block number.

30. The system of claim 20 wherein said vector text information comprises a major street cross-section.

31. The method of claim 20 wherein said first display segment and said second display segment are simultaneously displayed.

32. A method for combining information for fleet management;

providing a plurality of vehicle positions for a predetermined time to a first database;

providing a digitized representation of a raster map to a second database and displaying said digitized representation on a first display segment;

providing vector text information comprising intelligent street information of said digitized representation of said raster map to a third database; and correlating said plurality of vehicle locations to said vector text information and said digitized representation; and displaying said plurality of vehicle locations each as a user locatable mark on said first display segment.

33. The method of claim 32 further comprising displaying each of said plurality of vehicle locations as said vector text information on a second display segment.

34. The method of claim 33 wherein said raster map is digitally scanned from a road map.

35. The method of claim 32 wherein each of said plurality of vehicle positions comprises a first value and a second value.

36. The method of claim 35 wherein said first value is a latitude and said second value is a longitude.

37. The method of claim 32 wherein said vector text information comprises a street name.

38. The method of claim 32 wherein said vector text information comprises a block number.

39. The method of claim 32 wherein said vector text information comprises a major street cross-section.

40. The method of claim 32 wherein said first display segment and said second display segment are simultaneously displayed.

* * * * *